United States Patent
Dropps et al.

(10) Patent No.: US 7,583,597 B2
(45) Date of Patent: Sep. 1, 2009

(54) METHOD AND SYSTEM FOR IMPROVING BANDWIDTH AND REDUCING IDLES IN FIBRE CHANNEL SWITCHES

(75) Inventors: Frank R. Dropps, Maple Grove, MN (US); Craig M. Verba, Maple Grove, MN (US); Gary M. Papenfuss, St. Paul, MN (US)

(73) Assignee: Qlogic Corporation, Aliso Viejo, CA (US)

( * ) Notice: Subject to any disclaimer, the term of this patent is extended or adjusted under 35 U.S.C. 154(b) by 982 days.

(21) Appl. No.: 10/894,726

(22) Filed: Jul. 20, 2004

(65) Prior Publication Data

US 2005/0018649 A1    Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/26* (2006.01)

(52) U.S. Cl. .................................. 370/230.1; 370/238

(58) Field of Classification Search ................. 370/300, 370/360, 428, 229, 230, 230.1, 235, 236, 370/237, 238, 392

See application file for complete search history.

(56) References Cited

U.S. PATENT DOCUMENTS 4,081,612 A    3/1978  Hafner (Continued)

FOREIGN PATENT DOCUMENTS

EP    0649098    9/1994

(Continued)

OTHER PUBLICATIONS

Malavalli, et al., "Fibre Channel Framing and Signaling (FC-FS) Rev 1.10", *NCITS working draft proposed American National Standard for Information Technology*, (Jan. 25, 2001).

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method for routing fibre channel frames using a fibre channel switch element is provided. The switch element includes, a receiving segment in a fibre channel port for receiving the frames and a transmit segment that transmits the received frames. The method includes requesting an early frame transfer, wherein the transmit segment of a fibre channel port requests an early frame transfer from a receiving segment of the fibre channel port before a frame has arrived at the transmit segment; activating an early frame transfer; determining if there is a need for aborting the early frame transfer request; and selecting a different source port if there is a need for aborting an early frame transfer request.

23 Claims, 10 Drawing Sheets

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A * | 9/1987 | Struger | 710/2 |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,579,443 A * | 11/1996 | Tatematsu et al. | 455/521 |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,677,909 A * | 10/1997 | Heide | 370/347 |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,757,771 A | 5/1998 | Li et al. | |
| 5,764,927 A * | 6/1998 | Murphy et al. | 710/105 |
| 5,768,271 A | 6/1998 | Seid et al. | |
| 5,768,533 A | 6/1998 | Ran | |
| 5,784,358 A | 7/1998 | Smith et al. | |
| 5,790,545 A * | 8/1998 | Holt et al. | 370/398 |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A * | 10/1998 | Johnson et al. | 370/229 |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,925,119 A | 7/1999 | Maroney | |
| 5,936,442 A | 8/1999 | Liu et al. | |
| 5,937,169 A | 8/1999 | Connery et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A * | 1/2000 | Wills | 370/236 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A * | 4/2000 | Bauman | 370/229 |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills et al. | |
| 6,324,181 B1 | 11/2001 | Wong et al. | 370/403 |
| 6,330,236 B1 | 12/2001 | Ofek et al. | |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,389,479 B1 | 5/2002 | Boucher et al. | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 * | 7/2002 | Schwartz et al. | 370/392 |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry et al. | 710/261 |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |

| | | | | | |
|---|---|---|---|---|---|
| 6,614,796 B1 | 9/2003 | Black et al. | 7,233,570 B2 | 6/2007 | Gregg |
| 6,622,206 B1 | 9/2003 | Kanamaru et al. | 7,233,985 B2 | 6/2007 | Hahn et al. |
| 6,629,161 B2 | 9/2003 | Matsuki et al. | 7,245,613 B1 | 7/2007 | Winkles et al. |
| 6,643,298 B1 | 11/2003 | Brunheroto et al. | 7,245,627 B2 | 7/2007 | Goldenberg et al. |
| 6,657,962 B1 | 12/2003 | Barri et al. | 7,248,580 B2 | 7/2007 | George et al. |
| 6,684,209 B1 | 1/2004 | Ito et al. | 7,263,593 B2 | 8/2007 | Honda et al. |
| 6,697,359 B1 | 2/2004 | George ................... 370/357 | 7,266,286 B2 | 9/2007 | Tanizawa et al. |
| 6,697,368 B2 | 2/2004 | Chang et al. | 7,269,131 B2 | 9/2007 | Cashman et al. |
| 6,697,914 B1 | 2/2004 | Hospodor et al. | 7,269,168 B2 | 9/2007 | Roy et al. |
| 6,718,497 B1 | 4/2004 | Whitby-Strevens | 7,277,431 B2 | 10/2007 | Walter et al. |
| 6,738,381 B1 | 5/2004 | Agnevik et al. | 7,287,063 B2 | 10/2007 | Baldwin et al. |
| 6,744,772 B1 | 6/2004 | Eneboe et al. | 7,292,593 B1 | 11/2007 | Winkles et al. |
| 6,760,302 B1 | 7/2004 | Ellinas et al. | 7,315,511 B2 | 1/2008 | Morita et al. |
| 6,765,871 B1 | 7/2004 | Knobel et al. | 7,327,680 B1 | 2/2008 | Kloth |
| 6,779,083 B2 | 8/2004 | Ito et al. | 7,346,707 B1 | 3/2008 | Erimli |
| 6,785,241 B1 | 8/2004 | Lu et al. | 7,352,740 B2 | 4/2008 | Hammons et al. |
| 6,807,181 B1 | 10/2004 | Weschler | 7,397,788 B2 | 7/2008 | Mies et al. |
| 6,816,492 B1 | 11/2004 | Turner et al. | 7,406,034 B1 | 7/2008 | Cometto et al. |
| 6,816,750 B1 | 11/2004 | Klaas | 7,443,794 B2 | 10/2008 | George et al. |
| 6,859,435 B1 | 2/2005 | Lee et al. | 7,460,534 B1 | 12/2008 | Ballenger |
| 6,865,155 B1 | 3/2005 | Wong et al. | 7,466,700 B2 | 12/2008 | Dropps et al. |
| 6,865,157 B1 | 3/2005 | Scott et al. | 7,471,691 B2 | 12/2008 | Black et al. |
| 6,886,141 B1 | 4/2005 | Kunz et al. | 2001/0011357 A1 | 8/2001 | Mori |
| 6,888,831 B1 | 5/2005 | Hospodor et al. | 2001/0022823 A1 | 9/2001 | Renaud |
| 6,901,072 B1 | 5/2005 | Wong | 2001/0033552 A1* | 10/2001 | Barrack et al. ............... 370/282 |
| 6,904,507 B2 | 6/2005 | Gil | 2001/0038628 A1 | 11/2001 | Ofek et al. ................. 370/392 |
| 6,922,408 B2 | 7/2005 | Bloch et al. | 2001/0043564 A1 | 11/2001 | Bloch et al. |
| 6,928,470 B1 | 8/2005 | Hamlin | 2001/0047460 A1 | 11/2001 | Kobayashi et al. |
| 6,934,799 B2 | 8/2005 | Acharya et al. | 2002/0016838 A1 | 2/2002 | Geluc et al. |
| 6,941,357 B2 | 9/2005 | Nguyen et al. | 2002/0034178 A1 | 3/2002 | Schmidt et al. |
| 6,941,482 B2 | 9/2005 | Strong | 2002/0071387 A1 | 6/2002 | Horiguchi et al. |
| 6,947,393 B2 | 9/2005 | Hooper, III | 2002/0103913 A1 | 8/2002 | Tawil et al. |
| 6,952,659 B2 | 10/2005 | King et al. | 2002/0104039 A1 | 8/2002 | DeRolf et al. |
| 6,968,463 B2 | 11/2005 | Pherson et al. | 2002/0118692 A1 | 8/2002 | Oberman et al. |
| 6,975,627 B1 | 12/2005 | Parry et al. | 2002/0122428 A1 | 9/2002 | Fan et al. |
| 6,983,342 B2 | 1/2006 | Helenic et al. | 2002/0124124 A1 | 9/2002 | Matsumoto et al. |
| 6,987,768 B1 | 1/2006 | Kojima et al. | 2002/0147560 A1 | 10/2002 | Devins et al. |
| 6,988,130 B2 | 1/2006 | Blumenau et al. | 2002/0147843 A1 | 10/2002 | Rao |
| 6,988,149 B2 | 1/2006 | Odenwald | 2002/0156918 A1 | 10/2002 | Valdevit et al. |
| 7,000,025 B1 | 2/2006 | Wilson | 2002/0159385 A1 | 10/2002 | Susnow et al. |
| 7,002,926 B1 | 2/2006 | Eneboe et al. | 2002/0172195 A1 | 11/2002 | Pekkala et al. |
| 7,010,607 B1 | 3/2006 | Bunton | 2002/0174197 A1 | 11/2002 | Schimke et al. |
| 7,024,410 B2 | 4/2006 | Ito et al. | 2002/0191602 A1 | 12/2002 | Woodring et al. |
| 7,031,615 B2 | 4/2006 | Genrile | 2002/0194294 A1 | 12/2002 | Blumenau et al. |
| 7,039,070 B2 | 5/2006 | Kawakatsu | 2002/0196773 A1 | 12/2002 | Berman |
| 7,039,870 B2 | 5/2006 | Takaoka et al. | 2003/0002503 A1 | 1/2003 | Brewer et al. |
| 7,047,326 B1 | 5/2006 | Crosbie et al. | 2003/0002516 A1 | 1/2003 | Boock et al. |
| 7,050,392 B2 | 5/2006 | Valdevit | 2003/0016683 A1 | 1/2003 | George et al. |
| 7,051,182 B2 | 5/2006 | Blumenau et al. | 2003/0021239 A1 | 1/2003 | Mullendore et al. |
| 7,055,068 B2 | 5/2006 | Riedl | 2003/0026267 A1 | 2/2003 | Oberman et al. |
| 7,061,862 B2 | 6/2006 | Horiguchi et al. | 2003/0026287 A1 | 2/2003 | Mullendore et al. |
| 7,061,871 B2 | 6/2006 | Sheldon et al. | 2003/0033487 A1 | 2/2003 | Pfister et al. |
| 7,076,569 B1 | 7/2006 | Bailey et al. | 2003/0035433 A1 | 2/2003 | Craddock et al. |
| 7,082,126 B2 | 7/2006 | Ain et al. | 2003/0046396 A1 | 3/2003 | Richter et al. |
| 7,092,374 B1 | 8/2006 | Gubbi | 2003/0056000 A1 | 3/2003 | Mullendore et al. |
| 7,110,394 B1 | 9/2006 | Chamdani et al. | 2003/0063567 A1 | 4/2003 | Dehart |
| 7,120,728 B2 | 10/2006 | Krakirian et al. | 2003/0072316 A1 | 4/2003 | Niu et al. |
| 7,123,306 B2 | 10/2006 | Goto et al. | 2003/0076788 A1 | 4/2003 | Grabauskas et al. |
| 7,124,169 B2 | 10/2006 | Shimozono et al. | 2003/0079019 A1 | 4/2003 | Lolayekar et al. |
| 7,150,021 B1 | 12/2006 | Vajjhala et al. | 2003/0084219 A1 | 5/2003 | Yao et al. |
| 7,151,778 B2 | 12/2006 | Zhu et al. | 2003/0086377 A1 | 5/2003 | Berman |
| 7,171,050 B2 | 1/2007 | Kim | 2003/0091062 A1 | 5/2003 | Lay et al. |
| 7,185,062 B2 | 2/2007 | Lolayekar et al. | 2003/0093607 A1 | 5/2003 | Main et al. |
| 7,187,688 B2 | 3/2007 | Garmire et al. | 2003/0103451 A1 | 6/2003 | Lutgen et al. |
| 7,188,364 B2 | 3/2007 | Volpano | 2003/0112819 A1 | 6/2003 | Kofoed et al. |
| 7,190,667 B2 | 3/2007 | Susnow et al. | 2003/0115355 A1 | 6/2003 | Cometto et al. |
| 7,194,538 B1 | 3/2007 | Rabe et al. | 2003/0117961 A1 | 6/2003 | Chuah et al. |
| 7,200,108 B2 | 4/2007 | Beer et al. | 2003/0118053 A1 | 6/2003 | Edsall et al. |
| 7,200,610 B1 | 4/2007 | Prawdiuk et al. | 2003/0120743 A1 | 6/2003 | Coatney et al. |
| 7,209,478 B2 | 4/2007 | Rojas et al. | 2003/0120791 A1 | 6/2003 | Weber et al. |
| 7,215,680 B2 | 5/2007 | Mullendore et al. | 2003/0120983 A1 | 6/2003 | Vieregge et al. |
| 7,221,650 B1 | 5/2007 | Cooper et al. | 2003/0126223 A1 | 7/2003 | Jenne et al. |
| 7,230,929 B2 | 6/2007 | Betker et al. | 2003/0126242 A1 | 7/2003 | Chang |

| | | |
|---|---|---|
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 | 9/2003 | Waschura et al. |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 | 4/2004 | Warren et al. |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0120340 A1 | 6/2004 | Furey et al. |
| 2004/0123181 A1 | 6/2004 | Moon et al. |
| 2004/0125799 A1 | 7/2004 | Buer |
| 2004/0141518 A1 | 7/2004 | Milligan et al. |
| 2004/0141521 A1 | 7/2004 | George ........................ 370/463 |
| 2004/0151188 A1 | 8/2004 | Maveli et al. |
| 2004/0153526 A1 | 8/2004 | Haun et al. |
| 2004/0153566 A1 | 8/2004 | Lalsangi et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0218531 A1 | 11/2004 | Cherian et al. |
| 2004/0267982 A1 | 12/2004 | Jackson et al. |
| 2005/0018673 A1 | 1/2005 | Dropps et al. |
| 2005/0023656 A1 | 2/2005 | Leedy |
| 2005/0036485 A1 | 2/2005 | Eilers et al. |
| 2005/0036499 A1 | 2/2005 | Dutt et al. |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0117522 A1 | 6/2005 | Basavaiah et al. |
| 2005/0177641 A1 | 8/2005 | Yamagami |
| 2005/0188245 A1 | 8/2005 | Seto et al. |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| WO | WO-98/36537 | 8/1998 |
| WO | WO-01/95566 | 12/2001 |
| WO | WO03/088050 | 10/2003 |

OTHER PUBLICATIONS

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

Curtis, A. R., "Design Considerations for 10-Gbit Fibre Channel", *Curtis A. Ridgeway, Distinguished I/O Architect, Storage and Computing ASIC's Division, LSI Logic Corp.*

Malavalli, Kumar, "High Speed Fibre Channel Switching Fabric Devices", *Proceedings of the SPIE, SPIE*, Bellingham, VA, USA vol. 1577, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, PA 15260, (2001),197-211.

Ridgeway, Curt, "0GFC-40GFC using 4-lane XAUI's", *LSI Logic Presentation—T11/03-069v0.*

"Deliver Server-Free Backup", *Pathlight & Computer Associates*, White Paper of Apr. 2000, Ithaca, New York, XP-002381153,1-8.

Naik, D., "Inside Windows Storage:Server Storage Technologies for Windows 2000, Windows Server 2003 and Beyond", *Addison-Wesley, US, Chapter 5, XP-002381152*, (Jul. 15, 2003),137-173.

Brown, Douglas W., "A State-Machine Synthesizer", *18th Design Automation Conference*, (1981),301-305.

Banks, David C., et al., "Link Trunking and Measuring Link Latency in Fibre Channel Fabric", Provisional U.S. Appl. No. 60/286,046, 1-52.

"Examination Report from the European Patent Office dated Oct. 12, 2007 for European Application No. 05 805 632.6",.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp. Soc. Press., Vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al, "Virtual Channel Architecture", Presentation by Brocade to T11/03-369V0 dated Jun. 2, 2003.

International Preliminary Report on Patentability dated Apr. 3, 2007, for International patent application No. PCT/US2005/034844.

International Preliminary Report on Patentability dated Apr. 3, 2007, for International patent application No. PCT/US2005/034758.

International Preliminary Report on Patentability dated Apr. 11, 2007, for International patent application No. PCT/US2005/034845.

International Preliminary Report on Patentability dated Apr. 3, 2007, for International patent application No. PCT/US2005/035064.

International Preliminary Report on Patentability dated Jul. 24, 2007, for International patent application No. PCT/2005/42528.

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Sep. 6, 2007 for U.S. Appl. No. 10/889,337".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Dec. 7, 2007 for U.S. Appl. No. 10/961,463".

"Office Action from USPTO dated Mar. 5, 2008 for U.S. Appl. No. 10/889,259".

"Office Action from USPTO dated Mar. 7, 2008 for U.S. Appl. No. 10/894,629".

"Office Action from USPTO dated Mar. 20, 2008 for U.S. Appl. No. 10/894,732".

"Notice of Allowance from USPTO dated Apr. 4, 2008 for U.S. Appl. No. 11/608,634".

"Office Action from USPTO dated Apr. 4, 2008 for U.S. Appl. No. 10/957,465".

"Notice of Allowance from USPTO dated Apr. 10, 2008 for U.S. Appl. No. 10/241,153".

"Office Action from USPTO dated Apr. 11, 2008 for U.S. Appl. No. 10/894,595".

"Office Action from USPTO dated Apr. 14, 2008 for U.S. Appl. No. 10,894,627".

"Office Action from USPTO dated Apr. 17, 2008 for U.S. Appl. No. 10/894,689".

"Notice of Allowance from USPTO dated Apr. 18, 2008 for U.S. Appl. No. 10/894,597".

"Final Office Action from USPTO dated Apr. 23, 2008 for U.S. Appl. No. 10/889,255".

"Final Office Action from USPTO dated Apr. 25, 2008 for U.S. Appl. No. 10/894,579".

"Final Office Action from USPTO dated Apr. 29, 2008 for U.S. Appl. No. 10/894,491".

"Office Action from USPTO dated May 2, 2008 for U.S. Appl. No. 11/037,922".

"Final Office Action from USPTO dated May 12, 2008 for U.S. Appl. No. 10/894,492".

"Office Action from USPTO dated May 14, 2008 for U.S. Appl. No. 10/956,502".

"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Sep. 23, 2008 for U.S. Appl. No. 12/031,585".
"Project-T11/1619-D/Rev. 0.50", *Information technology Industry Council, Fibre Channel: Framing and Signaling-2, Dec. 2004, Rev. 0.50*, 76, 81, 114, 115.
"Notice of Allowance from the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".

\* cited by examiner

METHOD AND SYSTEM FOR IMPROVING BANDWIDTH AND REDUCING IDLES IN FIBRE CHANNEL SWITCHES

CROSS REFERENCE TO RELATED APPLICATIONS

This application claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to improving dead time between frame transmission.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received (at receive buffers) and sent across (via transmit buffers) a network. Associated with these buffers are credits, which are the number of frames that a buffer can hold per fabric port.

In conventional fibre channel switches there is dead time between transmitted frames. For example, a transmit buffer requests for data after it has transmitted a frame. During this time the receive buffer already has frames waiting. This results in dead time and hence affects the overall efficiency of the switch.

Therefore, what is required is a method and system which allows a receive buffer to send data to transmit buffers earlier and improve bandwidth and reduce idles in fibre channel switches.

SUMMARY OF THE PRESENT INVENTION

In one aspect of the present invention, a method for routing fibre channel frames using a fibre channel switch element is provided. The method includes requesting an early frame transfer, wherein a transmit segment of a fibre channel port requests an early frame transfer from a receiving segment of the fibre channel port before a frame has arrived at the transmit segment; activating an early frame transfer; determining if there is a need for aborting the early frame transfer request; and selecting a different source port if there is a need for aborting an early frame transfer request.

The method further includes, transferring a frame if there is no need to abort the early frame transfer request; and generating a request abort command to abort the early frame transfer request, wherein the transmit segment sends the request abort command to the receiving segment.

A request abort command is generated if a frames status field lacks a destination bit value; if a frame's status indicates that not enough part of a frame has arrived properly; if a frame's status indicates that credit is unavailable for the frame; if the transmit segment does not have sufficient space to hold the frame; if an early frame transfer request was generated before a preference tag is received; or based on other information within the fibre channel switch element.

In another aspect of the present invention, a fibre channel switch element for routing fibre channel frames is provided. The switch element includes, a receiving segment in a fibre channel port for receiving the frames and a transmit segment that transmits the received frames, wherein the transmit segment of the fibre channel port requests an early frame transfer from the receiving segment of the fibre channel port before a frame has arrived at the transmit segment; the receive segment activates an early frame transfer; the transmit segment determines if there is a need for aborting the early frame transfer request; and a different source port is selected if there is a need for aborting an early frame transfer request.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"EOF": End of Frame

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.--Port or F. Sub.--Port.

"L_Port": A port that contains Arbitrated Loop functions associated with the Arbitrated Loop topology.

"N-Port": A direct fabric attached port.

"NL_Port": A L_Port that can perform the function of a N_Port.

"SOF": Start of Frame

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
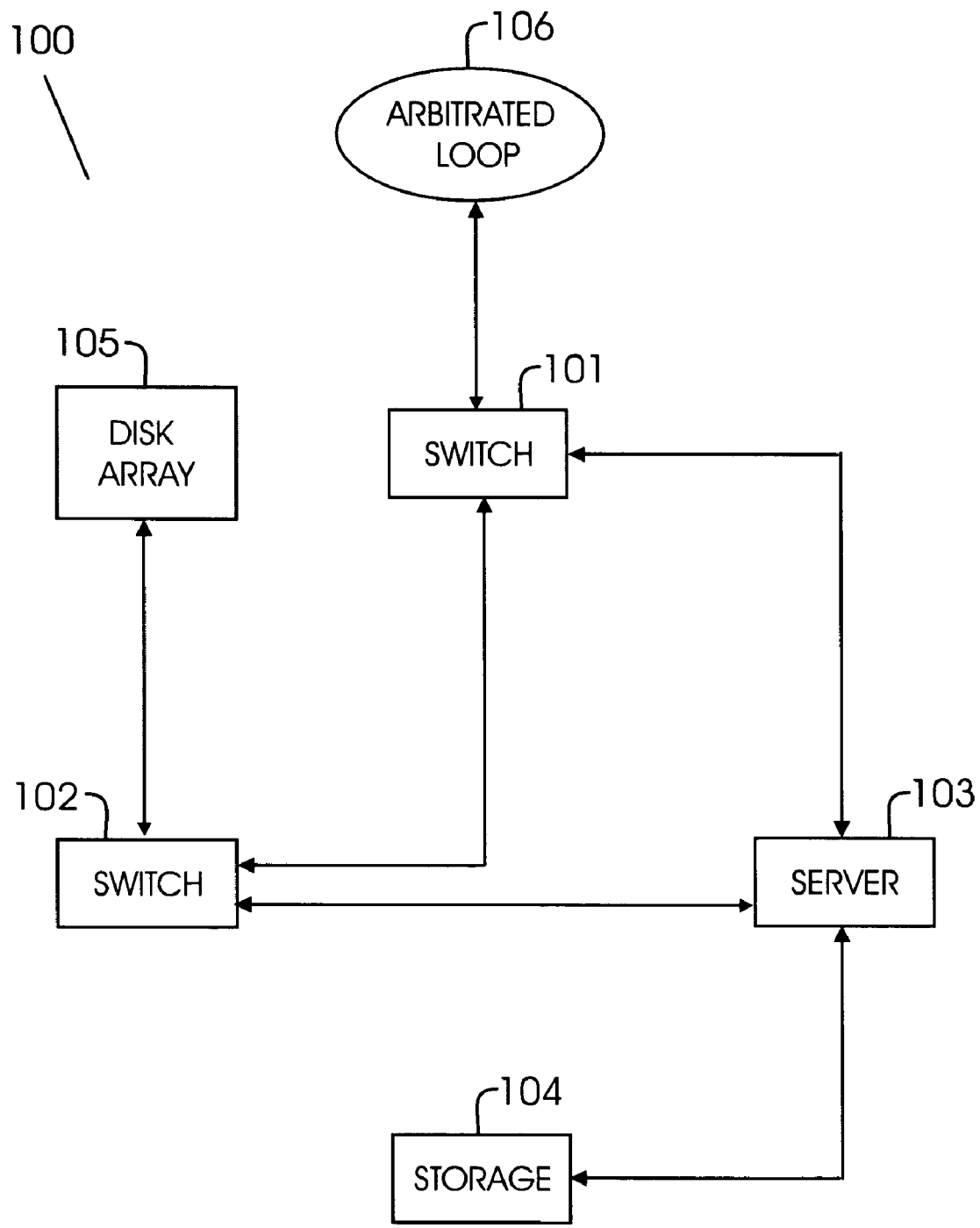
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
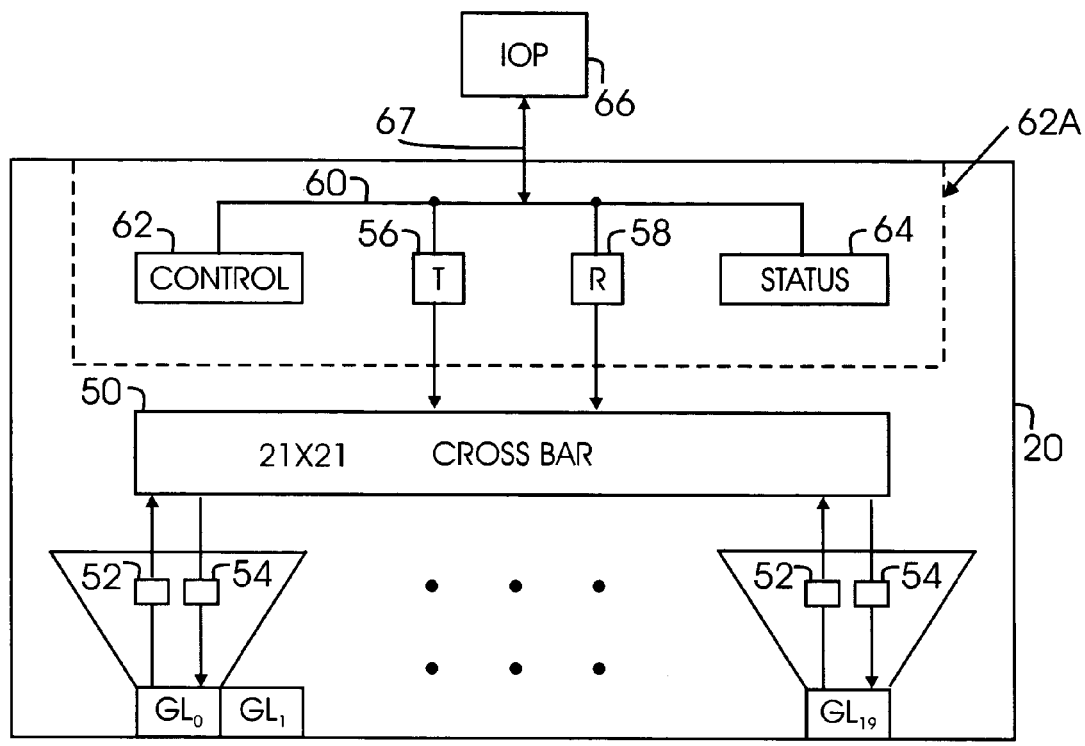
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
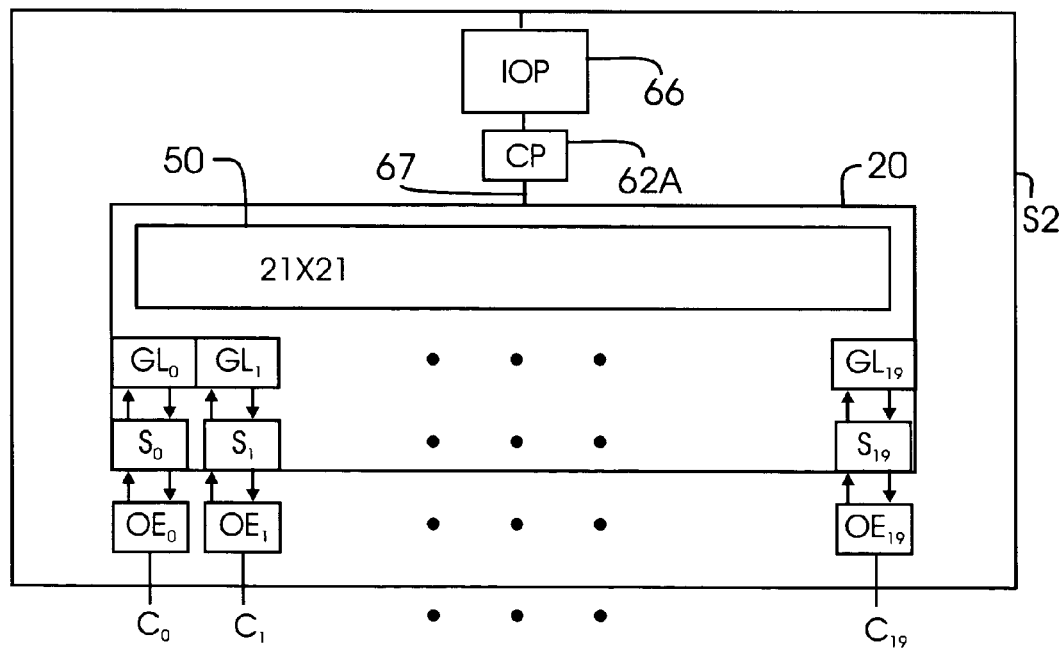
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
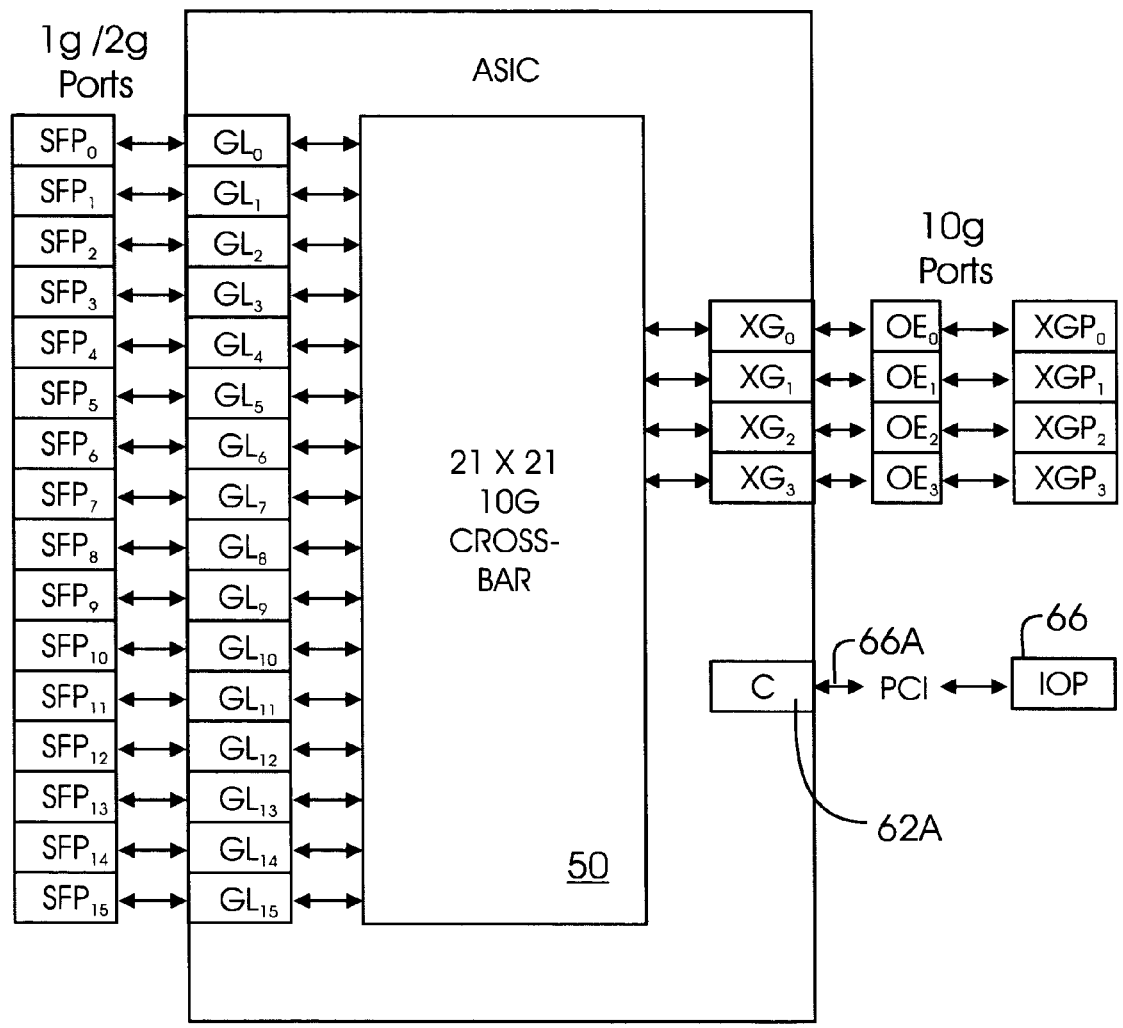
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E:
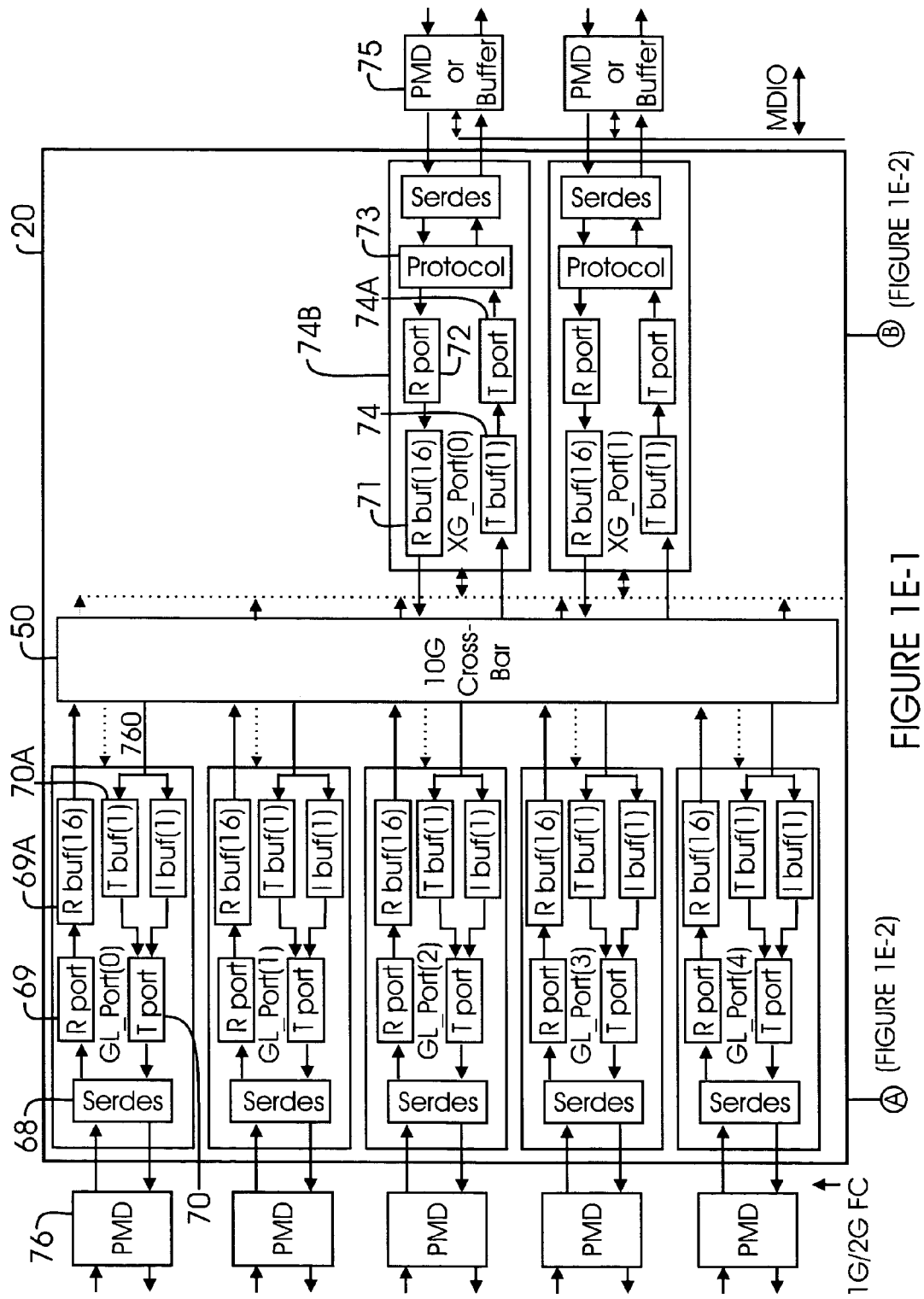
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
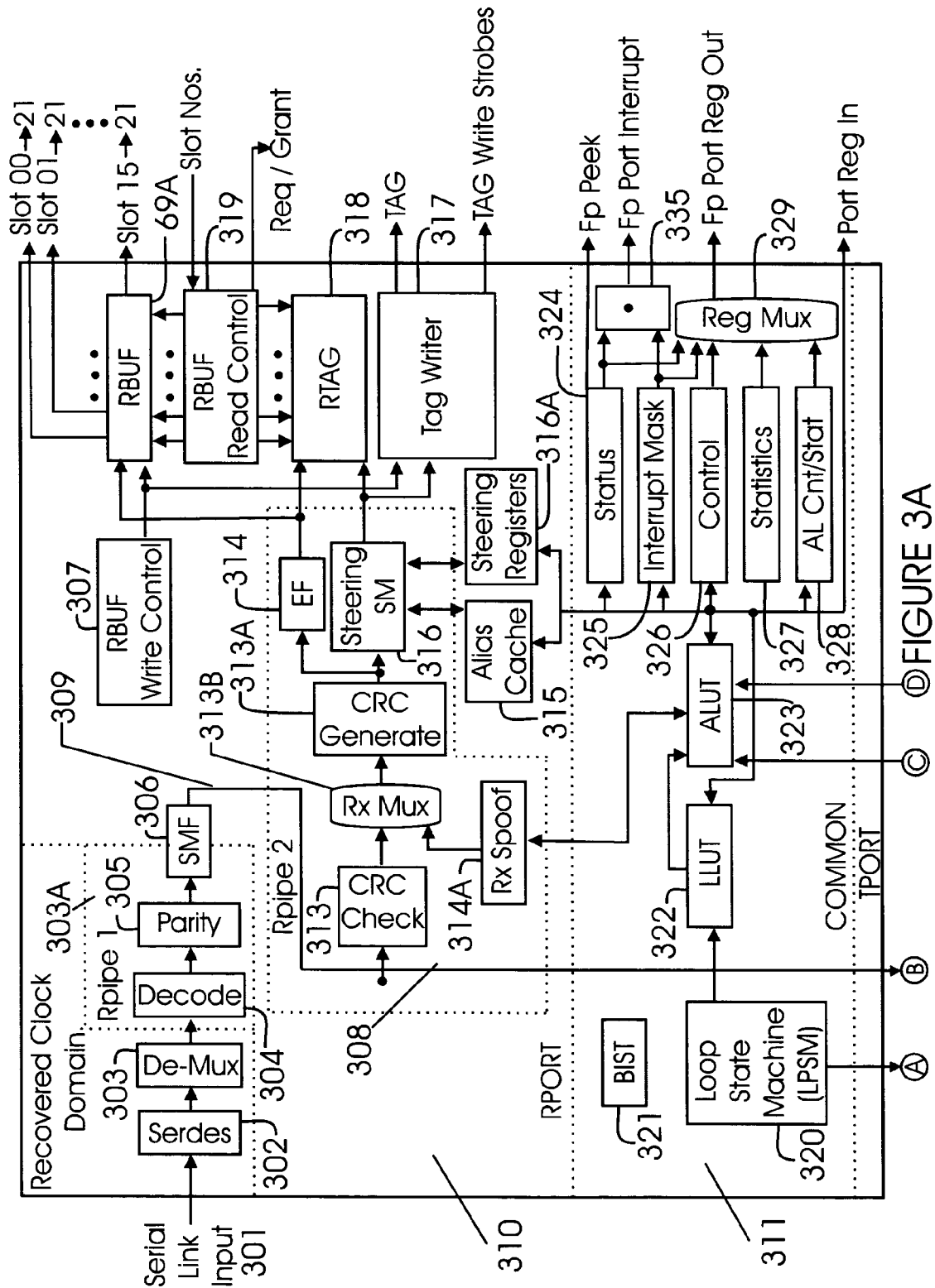
FIGS. 3A/3B (jointly referred to as FIG. 3) show a block diagram of a GL_Port, according to one aspect of the present invention.
Figure 3B:
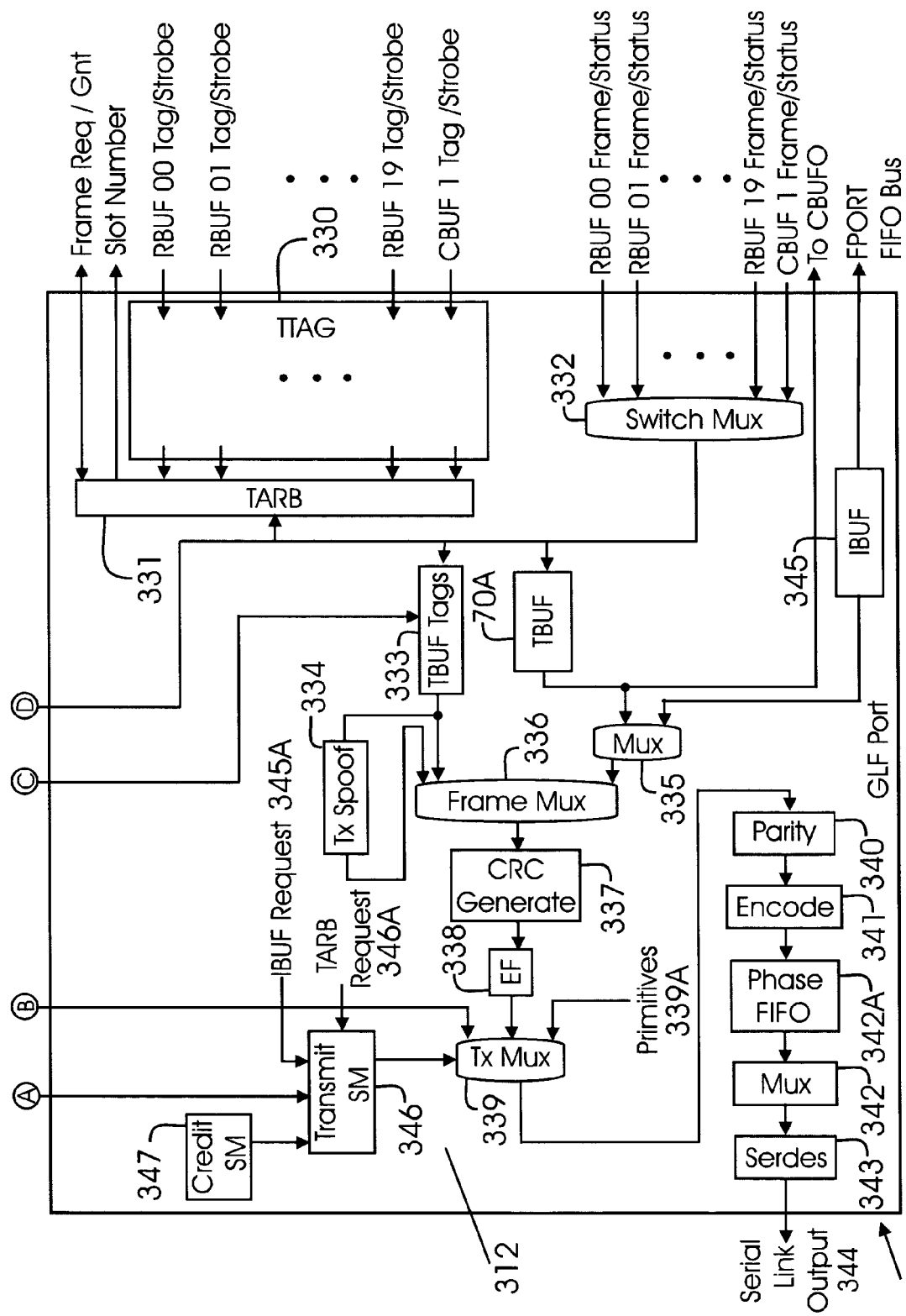

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT" 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
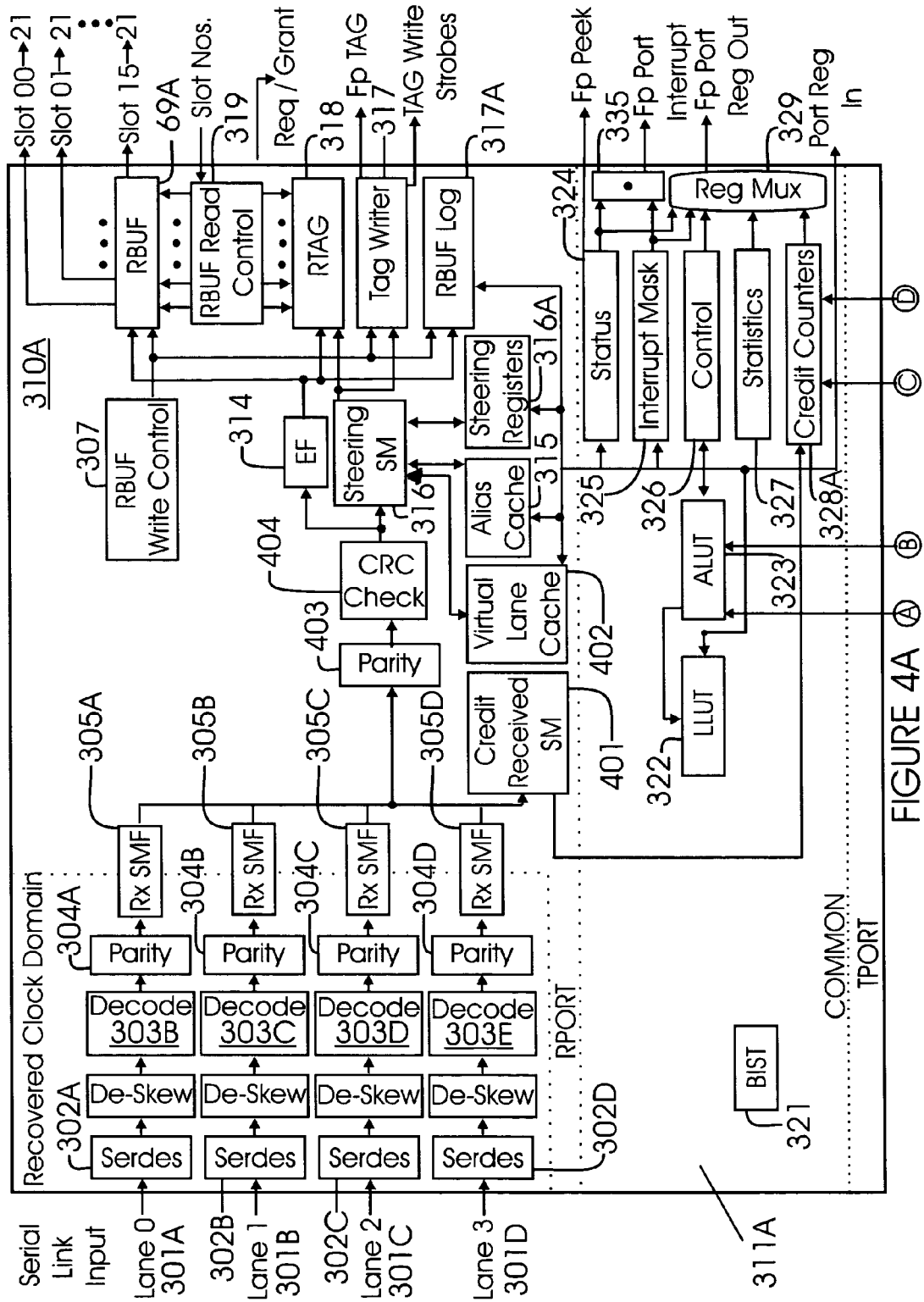
FIGS. 4A/4B (jointly referred to as FIG. 3) show a block diagram of XG_Port (10 G) port, according to one aspect of the present invention.
Figure 4B:
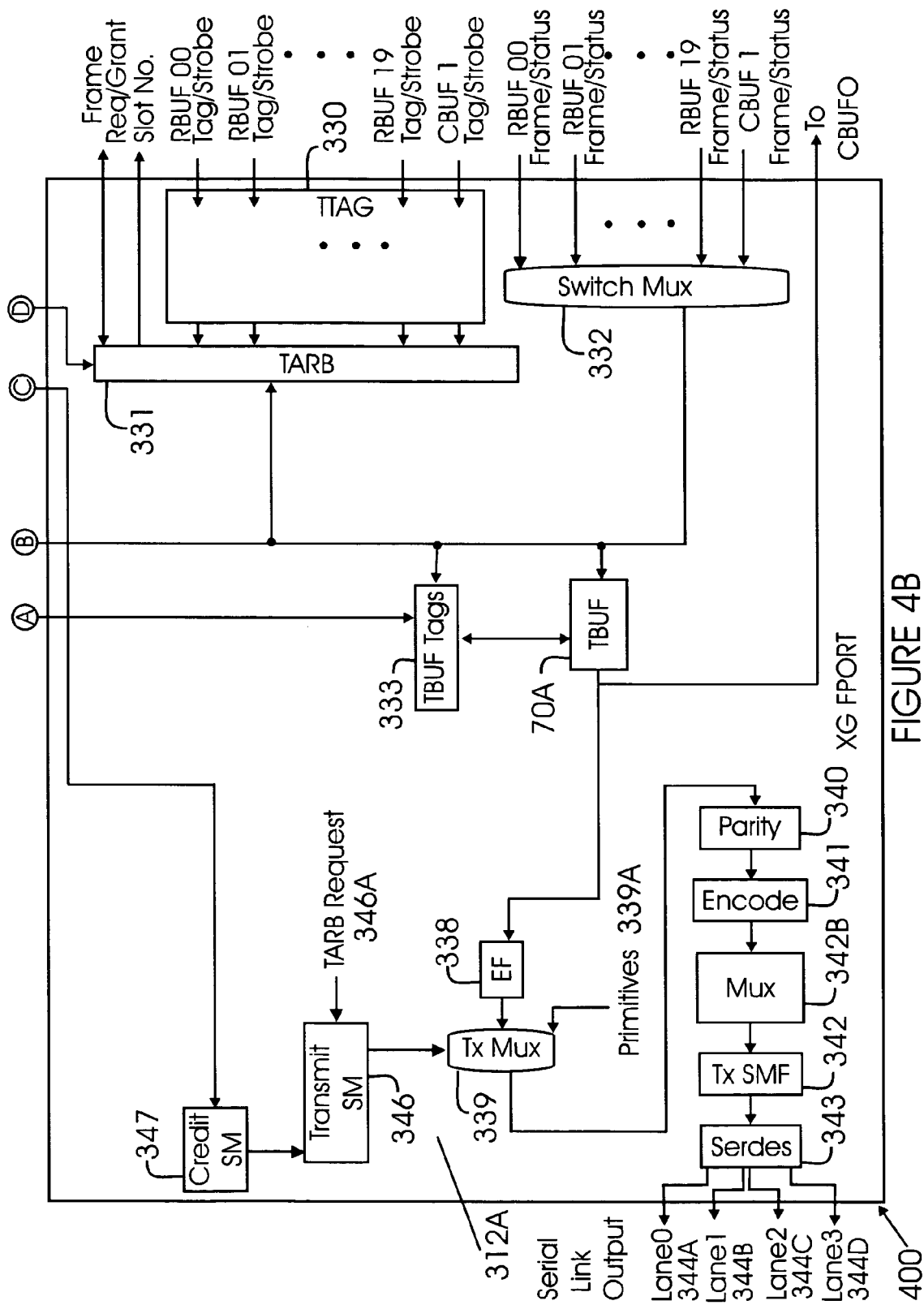

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

The Request Abort Feature:

To reduce dead time between transmitted frames, a "request-abort" (also referred to as "RA") feature is used in RBUF 69A. The RA feature allows TBUF 70A to request a frame from RBUF 69A before TBUF 70A completes the status check on a frame. If the status check is good, then RBUF 69A continues frame transmission. If the status check fails, then TBUF 70A aborts a current request and re-arbitrates, and RBUF 69A aborts the current frame transmission that was requested by TBUF 70A.

When RBUF 69A gets a request from a Transmit Port (TBUF70A), it sets a "read-active" bit that identifies the memory requested and the port that requested it. Upon receipt of a request-abort, RBUF 69A clear the bit. This will clear a read mask valid bit, which will cause the frame being transmitted to the particular Transmit Port to become invalid. If the Transmit Port has received any valid data before this action takes place, then the Transmit Port discards any received valid data.

For a multicast frame, the above action is the only action that takes place, as all other non-aborted requests for the same slot are honored. However, if RBUF 69A detects that this is the only transmission from that slot, then RBUF 69A clears the read window, the read address counter controlling that slot and the frame valid bit (signal).

It is noteworthy that RBUF 69A does not clear the active slot or the destination mask pointing to the aborting Transmit Port. This allows RBUF 69A to hold the slot for that Transmit Port and allows that Transmit Port to re-request the slot at a later time. Hence, a Transmit port may request, then abort a slot as many times as necessary until the status check for that slot passes.

Firmware for ASIC 20 enables or disables the "request-abort" feature. When enabled, TARB 331 is in a mode where frame transfer requests to RBUF 69A are activated earlier. The earlier activation of these requests starts frame transfer from RBUF 69A to TBUF 70A to occur earlier. These earlier transfers reduce dead time ("Idles") between transmitted frames. The early transfer requests are activated before all information about the transfer is known. If information is obtained later that this requested transfer should not occur, it is aborted.

Conditions for Sending Request-Abort:

As stated above, TBUF 70A completes status check on the frames. TBUF 70A looks at several fields in the frame status field, in order to determine whether to abort the requested transfer. Some of the fields that can trigger aborts are as follows:

The lack of the "DEST" bit in the status field indicates that the frame is no longer in RBUF 69A. Therefore, any early request for a non-existent frame is aborted. A "request-abort" is issued and TARB 331 then selects a different source port, or different frame from the same source to attempt another transfer.

The lack of a "CUT" bit in the frame status indicates that not enough of the frame has landed to transfer the frame properly. A "request abort" is issued and TARB 331 selects another frame to transfer.

The "VL_ID" field in the frame status is used to determine if the virtual lane assigned to the frame in the RBUF 69A has credit. If there is no credit for the frame, then the transfer to TBUF 70A does not happen. Again, a "request-abort" is issued and TARB 331 selects another frame to transfer.

There are other conditions not associated with frame status that can trigger the activation of a "request-abort". Some of these conditions are as follows:

A request-abort is issued if an early request is made without TBUF 70A having enough space, since space is needed for a frame in TBUF 70A before the next frame can be brought in. The early request to RBUF 69A is activated before TBUF 70A can predict if it has or will have space. In a later clock period, when TBUF 70A knows that it does not have space, then the request-abort is issued. If a previous frame read from TBUF 70A was delayed, the early request to the RBUF 69A is aborted.

Transmission of numerous "R_RDY's" or "VC_RDYs" can also delay the read of the previous frame in TBUF 70A. This can also trigger a "request-abort" command/signal.

If a preference frame tag is received, then TARB 331 cannot prevent the reordering of frame tags. In this case a non-preference tag that has been selected by TARB 331 will have to be selected again at a later time. Hence, any early (before the preference tag is received) frame transfer requests to RBUF 69A for a non-preference frame will be issued a "request-abort".

Firmware can also interrupt a early frame transfer request to RBUF 69A. If this interrupt occurs, a "request-abort" is issued. Firmware can set a control signal (via control register 326) that halts frame flow. Firmware can also activate a TTAG 330 Flush state for a different source port, which blocks TTAG 330 valid for a source port, which has been requested.

Figures 1, 1E, 2:
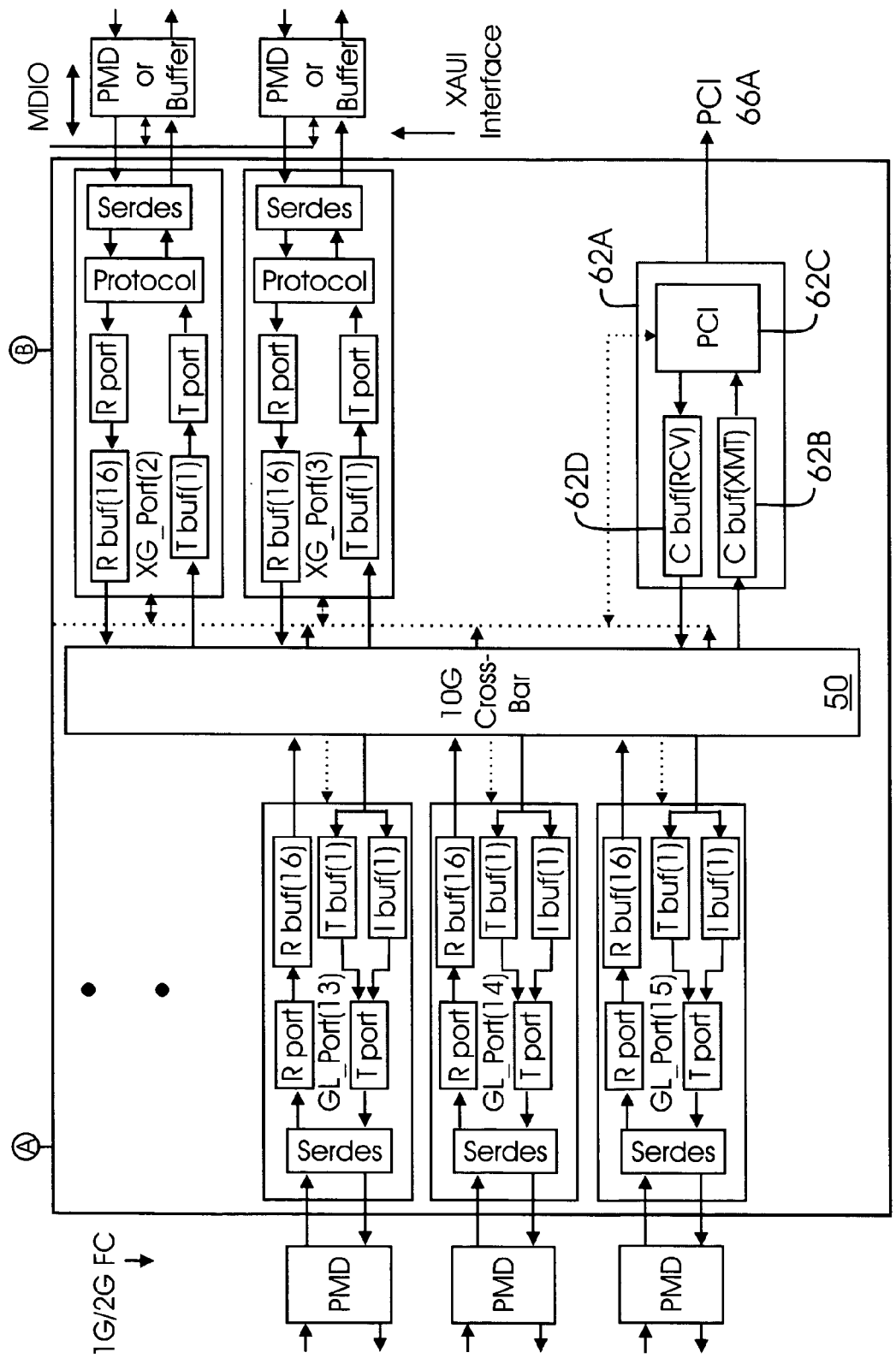
FIG. 2 shows a flow diagram for using an "early frame request", according to one aspect of the present invention.
Figure 2:
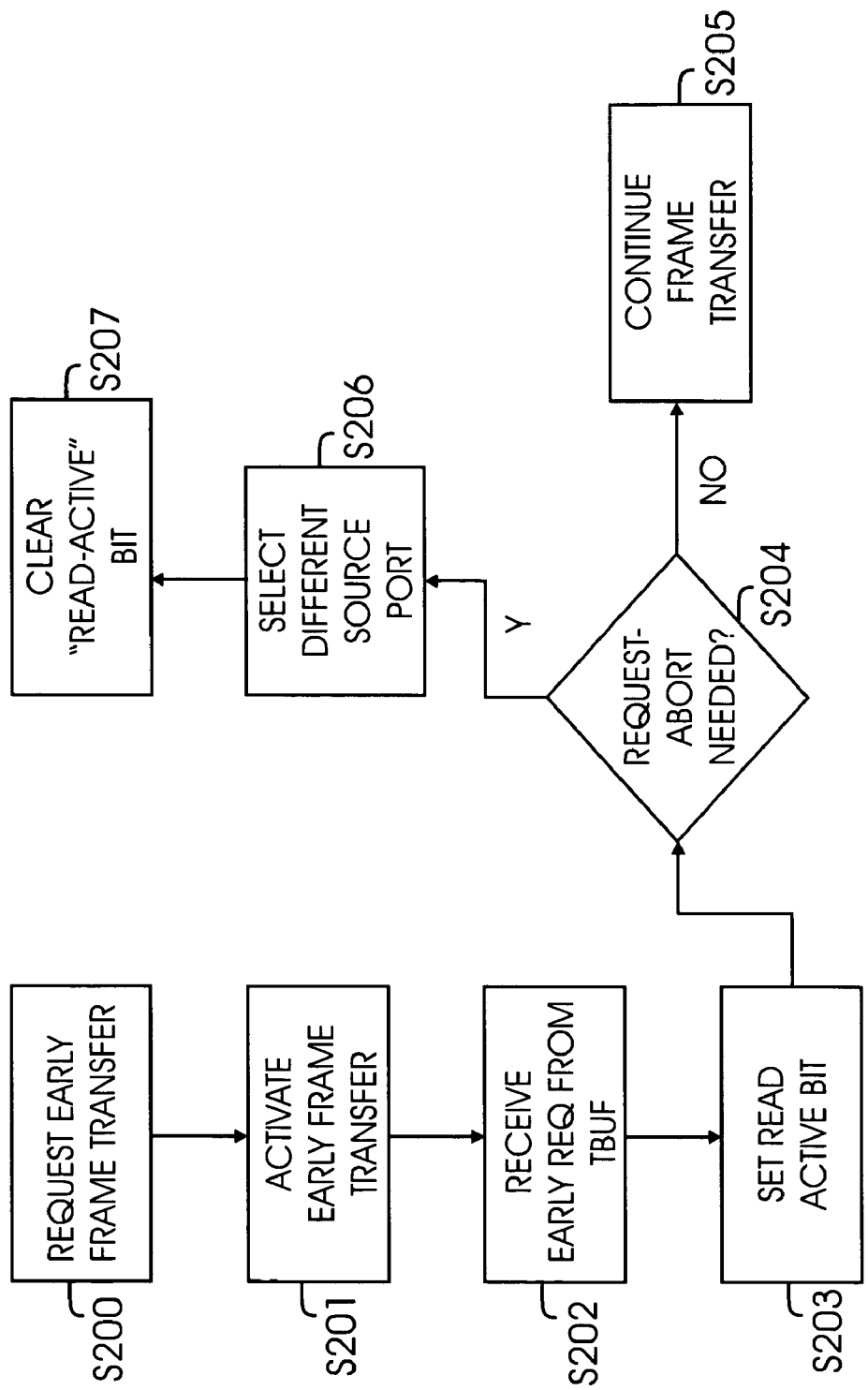

FIG. 2 shows a process flow diagram for using an early frame transfer request, according to one aspect of the present invention.

In step S200, TBUF 70A sends an "early" frame transfer request. TBUF 70A can send this request even before it has completed checking frame status.

In step S201, RBUF 69A activates early frame transfer.

In step S202, a request for frames is received from TBUF 70A and RBUF 69A sets a "read-active" bit, in step S203.

In step S204, the process determines if any conditions are met for sending a "request-abort". Some of those conditions have been described above.

In step S205, the process continues to transfer frames if the conditions are not met.

If the conditions are met, then in step S206, a "request-abort" signal is sent to RBUF 69A where the "read-active" bit is cleared (in step S207) and TARB 331 selects a different source port.

In one aspect of the present invention, because frames can be transferred early, it prevents dead time between transmitted frames, and hence improves overall efficiency and bandwidth.

Although the present invention has been described with reference to specific embodiments, these embodiments are illustrative only and not limiting. Many other applications and embodiments of the present invention will be apparent in light of this disclosure and the following claims.

What is claimed is:

1. A method for routing fibre channel frames using a fibre channel switch element having a plurality of ports, where each port includes a receive segment for receiving fibre channel frames and a transmit segment for transmitting fibre channel frames; comprising:

(a) requesting an early frame transfer of a fibre channel frame from a memory location of the receive segment of a fibre channel port to the transmit segment of the fibre channel port, before the transmit segment completes a status check, wherein the transmit segment sends a request to the receive segment for the early frame transfer;

(b) activating an early frame transfer; wherein the early frame transfer is activated at the receive segment;

(c) after completing the status check, determining if there is a need for aborting the early frame transfer request sent to the receive segment in step (a);

wherein the transmit segment determines if there is a need for aborting the early frame transfer request and if there is a need, generates a request-abort command to abort the early frame transfer request and sends the request abort command to the receive segment; and (e) after aborting the early frame transfer, selecting another frame from a different source port while continuing to have the memory location in step (a) available for the transmit segment to re-request the frame transfer from the same memory location.

2. The method of claim 1, further comprising:
   transferring the fibre channel frame if there is no need to abort the early frame transfer request gene rated by the transmit segment.

3. The method of claim 1, wherein firmware executed by the fibre channel switch element enables a request-abort feature permitting the transmit segment to send the early frame transfer request and aborting the early frame transfer request if the status check fails.

4. The method of claim 1, wherein the request-abort command is generated if a frame's status field lacks a destination bit value.

5. The method of claim 1, wherein the request-abort command is generated if a frame's status indicates that not enough of the frame has arrived properly at the receive segment.

6. The method of claim 1, wherein the request abort command is generated if a frame's status information used to determine that credit is unavailable for the frame.

7. The method of claim 1, wherein the request abort command is generated if the transmit segment does not have sufficient space to hold the frame.

8. The method of claim 1, wherein a request-abort command is generated if a plurality of R_RDYs, a primitive indicating available credit at the receive segment of the port, are transmitted by the transmit segment to another port.

9. The method of claim 1, wherein the request abort command is generated by firmware and used by the fibre channel switch element.

10. A fibre channel switch element for routing fibre channel frames, comprising:

a receive segment in a fibre channel port of the fibre channel switch element for receiving the fibre channel frames and a transmit segment that transmits the received fibre channel frames;

wherein the transmit segment of the fibre channel port requests an early frame transfer of a fibre channel frame from a memory location of the receive segment of the fibre channel port to the transmit segment, before the transmit segment completes a status check; and in response to the earl; frame transfer request, the receive segment activates an early frame transfer; and wherein, after completing the status check, the transmit segment determines if there is a need for aborting the early frame transfer request; generates a request abort command to abort the early frame transfer request if there is a need for aborting the early frame transfer request and sends the request abort command to the receive segment; and wherein after the early frame transfer request is aborted, another frame from a different source port is selected while the receive segment continues to have the memory location available for the transmit segment to re-request the frame transfer from the same memory location.

11. The fibre channel switch element of claim 10, wherein the transmit segment transfers the fibre channel frame if there is no need to abort the early frame transfer request.

12. The fibre channel switch element of claim 10, wherein firmware executed by the fibre channel switch element enables a request-abort feature permitting the transmit segment to send the early frame transfer request and aborting the early frame transfer request if the status check fails.

13. The fibre channel switch element of claim 10, wherein the request abort command is generated if the frame's status field lacks a destination bit value.

14. The fibre channel switch element of claim 10, wherein the request abort command is generated if the frame's status indicates that not enough of a frame has arrived properly.

15. The fibre channel switch element of claim 10, wherein the request abort command is generated if the frame's status information used to determine that credit is unavailable for the frame.

16. The fibre channel switch element of claim 10, wherein the request abort command is generated if the transmit segment does not have sufficient space to hold the frame.

17. The fibre channel switch element of claim 10, wherein the request abort command is generated if a plurality of R_RDYs, a primitive indicating available credit at the receive segment of the port, are transmitted by the transmit segment to another port.

18. The fibre channel switch element of claim 10, wherein the request abort command is generated by firmware used by the fibre channel switch element.

19. A switch element, comprising:
a receive segment of a port for receiving a frame; and
a transmit segment of the port for transmitting a frame; and
before the transmit segment completes a status check; the transmit segment sends a request for an early frame transfer to the receive segment to transfer the frame from a memory location of the receive segment to the transmit segment; and in response to the early frame transfer request, the receive segment activates an early frame transfer;
wherein, after completing the status check, the transmit segment determines if there is a need for aborting the early frame transfer request; and if there is a need, generates a request to abort the early frame transfer request and sends the request to the receive segment so that the early frame transfer is aborted; and
wherein after the early frame transfer is aborted the receive segment continues to have the memory location available for the transmit segment to re-request the frame transfer from the same memory location.

20. The switch element of claim 19, wherein the transmit segment generates a request-abort command to abort the early frame transfer request.

21. The switch element of claim 20; wherein the request-abort command to abort the early frame transfer is generated based on one or more of the following: (a) the frame's status field lacks a destination bit value; (b) the frame's status indicates that not enough of a frame has arrived properly; (c) the frame's status indicates that credit is unavailable for the frame; (d) if the transmit segment does not have sufficient space to hold the frame; (e) if a plurality of R_RDYs a primitive indicating available credit at the receive segment, are transmitted; and (f) if firmware of the switch element generates the request-abort command.

22. A method for a switch element having a plurality of ports, each port having a receive segment for receiving frames and a transmit segment for transmitting frames; comprising:
a. before the transmit segment completes a status check, requesting an early frame transfer of a frame from a memory location of the receive segment of a port to the transmit segment of the port; wherein the transmit segment sends a request to the receive segment for the early frame transfer;
b. activating an early frame transfer; wherein the early frame transfer is activated at the receive segment;
c. after completing the status check, determining if there is a need for aborting
the early frame transfer request sent to the receive segment in step (a); wherein the transmit segment determines if there is a need for aborting the early frame transfer request and if there is a need, generates a request-abort command to abort the early frame transfer request and sends the request abort command to the receive segment; and
(d) after aborting the early frame transfer, selecting another frame while continuing to have the memory location in step (a) available for the transmit segment to re-request transfer of the frame from the same memory location of step (a).

23. The method of claim 22, wherein the request-abort command to abort the early frame transfer is generated based on one or more of the following: (a) the frame's status field lacks a destination bit value; (b) the frame's status indicates that not enough of a frame has arrived properly; (c) the frame's status indicates that credit is unavailable for the frame: (d) if the transmit segment does not have sufficient spice to hold the frame; and (E) if firmware of the switch element generates the request-abort command.

* * * * *

UNITED STATES PATENT AND TRADEMARK OFFICE
CERTIFICATE OF CORRECTION

PATENT NO. : 7,583,597 B2  Page 1 of 1
APPLICATION NO. : 10/894726
DATED : September 1, 2009
INVENTOR(S) : Frank R. Dropps et al.

It is certified that error appears in the above-identified patent and that said Letters Patent is hereby corrected as shown below:

In column 11, line 64, in claim 2, delete "gene rated" and insert -- generated --, therefor.

In column 12, line 35, in claim 10, delete "earl;" and insert -- early --, therefor.

In column 14, line 2, in claim 21, delete "R_RDYs" and insert -- R_RDYs, --, therefor.

In column 14, line 37, in claim 23, delete "frame:" and insert -- frame; --, therefor.

In column 14, line 38, in claim 23, delete "spice" and insert -- space --, therefor.

Signed and Sealed this

Nineteenth Day of October, 2010

David J. Kappos
*Director of the United States Patent and Trademark Office*